US011486317B2

(12) United States Patent
Suleiman et al.

(10) Patent No.: US 11,486,317 B2
(45) Date of Patent: Nov. 1, 2022

(54) GAS TURBINE FUEL SYSTEM

(71) Applicant: General Electric Company, Schenectady, NY (US)

(72) Inventors: Baha Mahmoud Suleiman, Temple Terrace, FL (US); Hatem Mohamed Mohyeldin Ibrahim Selim, Muarraq (BH); Jeevankumar Krishnan, Bangalore (IN); Paul Burchell Glaser, Greenville, SC (US)

(73) Assignee: General Electric Company, Schenectady, NY (US)

( * ) Notice: Subject to any disclaimer, the term of this patent is extended or adjusted under 35 U.S.C. 154(b) by 394 days.

(21) Appl. No.: 16/557,432

(22) Filed: Aug. 30, 2019

(65) Prior Publication Data

US 2021/0062730 A1    Mar. 4, 2021

(51) Int. Cl.
| | | |
|---|---|---|
| *F02C 9/28* | (2006.01) | |
| *F02C 7/224* | (2006.01) | |
| *F02C 7/236* | (2006.01) | |
| *F02C 7/26* | (2006.01) | |

(52) U.S. Cl.
CPC ............... *F02C 9/28* (2013.01); *F02C 7/224* (2013.01); *F02C 7/236* (2013.01); *F02C 7/26* (2013.01); *F05D 2260/85* (2013.01); *F05D 2270/301* (2013.01); *F05D 2270/303* (2013.01)

(58) Field of Classification Search
CPC .. F23R 3/36; F02C 7/236; F02C 7/224; F02C 9/26; F02C 9/28
See application file for complete search history.

(56) References Cited

U.S. PATENT DOCUMENTS

| | | | |
|---|---|---|---|
| 3,766,734 A | 10/1973 | Jones | |
| 5,617,716 A * | 4/1997 | Schreiber | .................. F02C 3/30 |
| | | | 60/39.182 |
| 5,782,626 A * | 7/1998 | Joos | ...................... F23D 11/007 |
| | | | 431/181 |
| 6,751,941 B2 * | 6/2004 | Edelman | .................. F02C 7/08 |
| | | | 417/29 |
| 7,874,156 B2 * | 1/2011 | Wang | ........................ F02C 6/18 |
| | | | 60/736 |
| 7,930,998 B2 | 4/2011 | Cottell | |
| 7,934,474 B2 | 5/2011 | Cottell | |

(Continued)

FOREIGN PATENT DOCUMENTS

| | | |
|---|---|---|
| JP | S55156217 A | 12/1980 |
| JP | S60192837 A | 10/1985 |
| JP | S6329029 A | 2/1988 |

OTHER PUBLICATIONS

API Energy "Kerosene Jet Fuel" (Year: 2017).*

(Continued)

*Primary Examiner* — Todd E Manahan
*Assistant Examiner* — Thuyhang N Nguyen
(74) *Attorney, Agent, or Firm* — Fletcher Yoder, P.C.

(57) ABSTRACT

In a one embodiment, a gas turbine system that includes a first pump that supplies distillate fuel to a combustor. A second pump that supplies fuel oil to the combustor. A fuel selection unit that controls a first flow of distillate fuel and a second flow of fuel oil to the combustor. A controller that receives feedback from a sensor and in response to the feedback from the sensor controls the fuel selection unit to start the gas turbine system on the fuel oil.

19 Claims, 2 Drawing Sheets

(56) References Cited

U.S. PATENT DOCUMENTS

| | | | | |
|---|---|---|---|---|
| 8,302,406 B2* | 11/2012 | Baker | ..................... | F02C 9/36 |
| | | | | 60/772 |
| 8,833,052 B2* | 9/2014 | Loeven, II | ................ | F02C 7/22 |
| | | | | 60/39.463 |
| 9,243,804 B2* | 1/2016 | Zhang | ...................... | F02C 3/30 |
| 2011/0088447 A1* | 4/2011 | Parrish | ................... | F04B 51/00 |
| | | | | 73/1.57 |
| 2013/0086918 A1* | 4/2013 | Bothien | ................... | F02C 9/34 |
| | | | | 60/776 |
| 2013/0186057 A1* | 7/2013 | Shanmugam | ............ | F02C 3/20 |
| | | | | 60/39.463 |
| 2016/0290650 A1* | 10/2016 | Abd El-Nabi | ......... | F02C 7/222 |
| 2018/0080379 A1* | 3/2018 | Conlon | ................. | F25J 1/0012 |
| 2018/0112604 A1* | 4/2018 | Akiyama | ................. | F02C 3/22 |

OTHER PUBLICATIONS

API energy "Heavy Fuel Oils" (Year: 2017).*
Extended European Search Report for EP Application No. 20192510.4 dated Jan. 12, 2021; 7 pgs.

* cited by examiner

GAS TURBINE FUEL SYSTEM

BACKGROUND OF THE INVENTION

The subject matter disclosed herein relates to gas turbines.

Gas turbines produce power by combusting a mixture of air and fuel. The combustion of the air and fuel mixture generates exhaust gases that flow through a turbine containing rotors. As the exhaust gases flow through the turbine, the exhaust gases contact turbine blades on the rotors. The rotors rotate in response to the force of the exhaust gases on the turbine blades. Rotation of the rotors in turn rotates a shaft coupled to the rotors. The shaft couples to an electric generator which converts the mechanical energy of the shaft into electrical energy.

Gas turbines may combust a variety of fuels including diesel, fuel oil, and syngas. Some fuels may be more expensive than others. These less expensive fuels may be used during steady state operation of the gas turbine. However, these less expensive fuels, such as fuel oil, may not be used during startup or shutdown of gas turbines because they cause coking and/or wax buildup in fuel lines after shutdown. Accordingly, a startup fuel is used to start gas turbines, such as diesel. The startup fuel is used to bring the gas turbine to full speed with a partial load. After loading the gas turbine the fuel source changes to the steady state fuel used during steady state operation. During shutdown, the steady state fuel may be purged to prevent coking and wax buildup in the fuel lines. Unfortunately, the startup fuel is typically more expensive than the steady state fuel. Over time each gas turbine start increases the operational costs of the power plant.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a one embodiment, a gas turbine system that includes a first pump that supplies distillate fuel to a combustor. A second pump that supplies fuel oil to the combustor. A fuel selection unit that controls a first flow of distillate fuel and a second flow of fuel oil to the combustor. A controller that receives feedback from a sensor and in response to the feedback from the sensor controls the fuel selection unit to start the gas turbine system on the fuel oil.

In another embodiment, a system that includes a controller that receives feedback from one or more sensors. In response to the feedback from the one or more sensors, the controller controls a fuel selection unit that controls a first flow of the distillate fuel and a second flow of the fuel oil to a gas turbine system to start the gas turbine system on the fuel oil. The fuel oil consists essentially of hydrocarbon molecules with carbon chains greater than $C_{20}$.

In another embodiment, a method for starting a gas turbine with fuel oil. The method includes receiving a signal to start a gas turbine system. The method also detects a fuel used in the previous shutdown of the gas turbine. The method in response to detection of a distillate fuel used in the previous shutdown, starts the gas turbine system on the fuel oil. The fuel oil consists essentially of hydrocarbon molecules with carbon chains greater than $C_{20}$.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
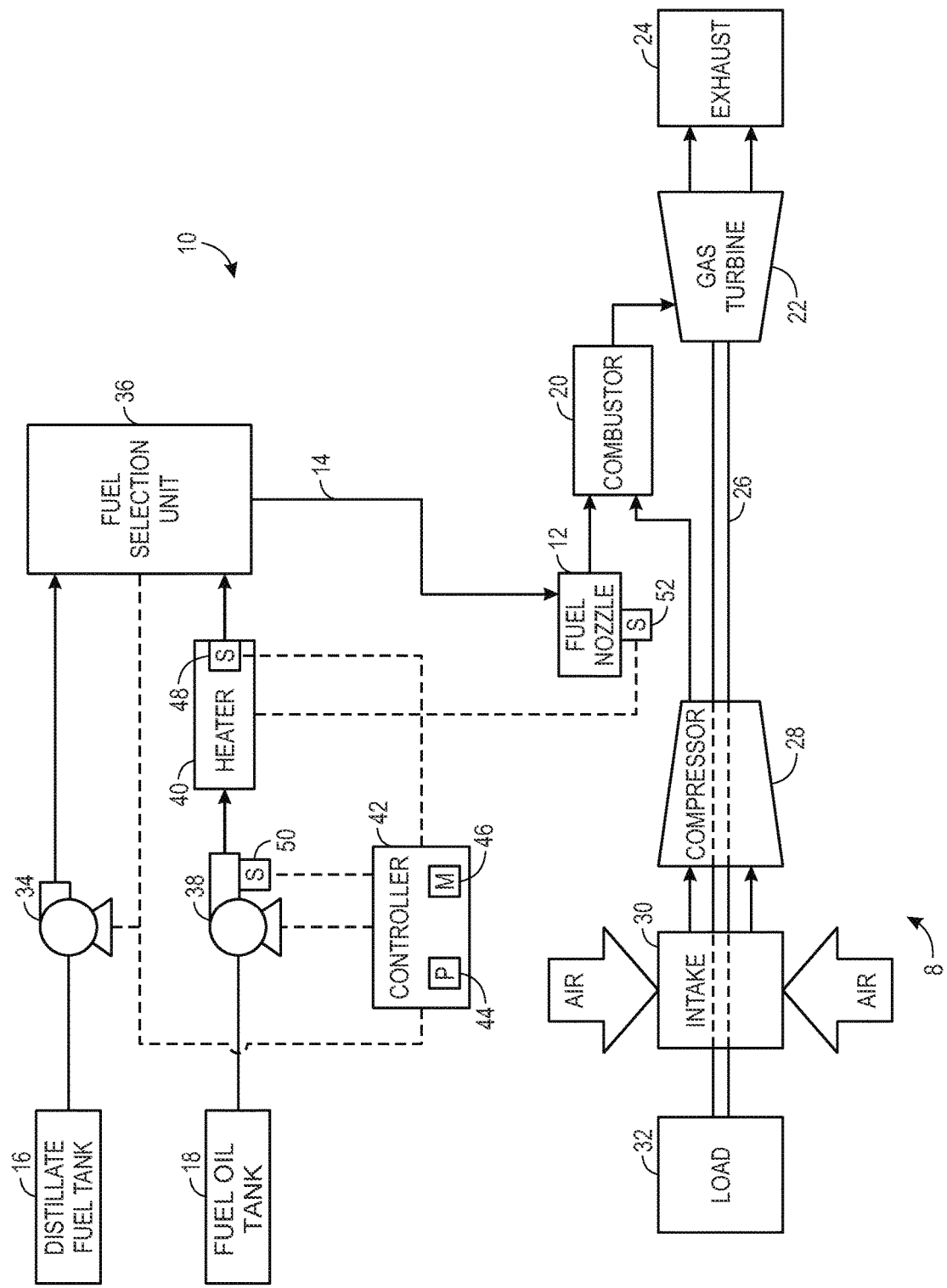
FIG. 1 is a schematic illustration of a turbine system, in accordance with an embodiment.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

As explained above, gas turbines may combust a variety of fuels including diesel, fuel oil, and syngas. For example, a gas turbine may be designed to accommodate liquid and/or gaseous fuels. In order to economically operate the gas turbine the least expensive fuels may be used. Unfortunately, inexpensive fuels may have undesirable effects on the gas turbine. For example, fuel oil may coke inside fuel lines or create wax buildups. Incomplete combustion of fuel oil may also create excessive soot within the gas turbine. Accordingly, different fuels may be used during different periods of operation. For example, during startup a first fuel (e.g., startup fuel) may be used to start the gas turbine. The first fuel may be diesel or some other distillate fuel that will not coke in the fuel lines or produce excessive soot as the gas turbine ramps up to steady state operations. Once the gas turbine is at full speed or at full speed with a partial load (e.g., 30% load), a second fuel (e.g., steady state fuel) may be used. After running the gas turbine with the second fuel, the first fuel may be again reintroduced before shutdown to purge the gas turbine of the second fuel. Purging the gas turbine of the second fuel before shutdown may therefore block coking and/or wax buildup in the fuel lines.

Unfortunately, typical startup fuels (e.g., distillate fuels) may be more expensive than the fuel used during steady state operation of the gas turbine. Therefore, the cost of starting and shutting down the gas turbine may increase the cost of operating the gas turbine. Accordingly, the cost of operating multiple gas turbines by a power plant may increase as these gas turbines are turned on and off depending power production needs. The embodiments described below include a gas turbine startup system and method that enables startup of a gas turbine with fuel oil or other cheaper fuels. By starting the gas turbine on fuel oil the gas turbine operator may reduce overall operating costs.

FIG. 1 is a schematic of an embodiment of a turbine system 8 with a gas turbine fuel system 10 that enables startup of the turbine system with fuel oil (i.e., hydrocarbon molecules with carbon chains of $C_{20}$ or greater). The turbine system 8 (e.g., dual-fuel turbine system) may use different types of liquid fuels to drive the turbine system 8. For example, the turbine system 8 may use distillate fuels (i.e., diesel, hydrocarbon molecules with carbon chains smaller than $C_{20}$) as well as fuel oil (i.e., hydrocarbon molecules with carbon chains of $C_{20}$ or greater). As depicted, fuel nozzles 12 (e.g., multi-tube fuel nozzles) intake a fuel through a fuel line(s) 14. The fuel line 14 may receive fuel from a distillate fuel tank or source 16 and a fuel oil tank or source 18. In the combustor, the liquid fuel is mixed with an oxidant, such as air, oxygen, oxygen-enriched air, oxygen reduced air, or any combination thereof. Although the following discussion refers to the oxidant as air, any suitable oxidant may be used with the disclosed embodiments. It should be understood that the term fuel oil in this application refers to hydrocarbon molecules with carbon chains of $C_{20}$ or greater and the term distillate fuel refers to hydrocarbon molecules with carbon chains smaller than $C_{20}$, such as diesel.

The turbine system 8 may include one or more fuel nozzles 12 located inside the plurality of combustors 20. The fuel-air mixture combusts in a chamber within each of the plurality of combustors 20, thereby creating hot pressurized exhaust gases. The plurality of combustors 20 direct the exhaust gases through a turbine 22 toward an exhaust outlet 24. As the exhaust gases pass through the turbine 22, the gases force turbine blades to rotate a shaft 26 along an axis of the turbine system 8. As illustrated, the shaft 26 may be connected to various components of the turbine system 8, including a compressor 28. The compressor 28 also includes blades coupled to the shaft 26. As the shaft 26 rotates, the blades within the compressor 28 also rotate, thereby compressing air from an air intake 30 through the compressor 28 and into the fuel nozzles 12 and/or the plurality of combustors 20. The shaft 26 may also be connected to a load 32, such as an electrical generator in a power plant. The load 32 may include any suitable device capable of being powered by the rotational output of the turbine system 8.

In order to supply fuel to the fuel nozzle 12, the gas turbine fuel system 10 includes one or more pumps 34 that pump distillate fuel (i.e., hydrocarbon molecules with carbon chains smaller than $C_{20}$) from the distillate fuel tank 16 to the fuel selection unit 36. The fuel system 10 also includes one or more pumps 38 that pump fuel oil to the fuel selection unit 36. Because fuel oil may have a high viscosity and may coke or form wax in fuel lines, the fuel system 10 includes one or more heaters 40 that heat the fuel oil to block and/or reduce wax formation and/or coking in the fuel lines. In other words, heating the fuel oil may facilitate movement of the fuel oil through one or more fuel lines (e.g., fuel line 14).

For example, the fuel selection unit 36 may include one or more valves (e.g., a three-way valve) that control the flow of distillate fuel and fuel oil to the fuel nozzle 12. Operation of the fuel selection unit 36 is controlled with signals from a controller 42. The controller 42 includes one or more processors 44, such as the illustrated microprocessor, and one or more memory devices 46. The controller 42 may also include one or more storage devices and/or other suitable components. The processor 44 may be used to execute software, such as software to control the opening and closing of one or more valves in the fuel selection unit 36.

The processor 44 may include multiple microprocessors, one or more "general-purpose" microprocessors, one or more special-purpose microprocessors, and/or one or more application specific integrated circuits (ASICS), or some combination thereof. For example, the processor 44 may include one or more reduced instruction set (RISC) processors.

The memory device 46 may include a volatile memory, such as random access memory (RAM), and/or a nonvolatile memory, such as read-only memory (ROM). The memory device 46 may store a variety of information and may be used for various purposes. For example, the memory device 46 may store processor executable instructions (e.g., firmware or software) for the processor 44 to execute. The storage device(s) (e.g., nonvolatile memory) may include ROM, flash memory, a hard drive, or any other suitable optical, magnetic, or solid-state storage medium, or a combination thereof. The storage device(s) may store data, instructions, and any other suitable data.

As explained above, fuels vary in cost. Accordingly, the least expensive fuels may be used, such as fuel oil (i.e., hydrocarbon molecules with carbon chains greater than $C_{20}$). The fuel system 10 enables the turbine system 8 to start operation on fuel oil which may reduce the costs associated with operating the turbine system 8. During a typical shutdown of the turbine system 8, the controller 42 directs the fuel selection unit 36 to open and direct the distillate fuel through the fuel selection unit 36, through the fuel line 14, and into the fuel nozzle 12. The distillate fuel then enters the combustor 20 where it combusts as the turbine system 8 shuts down. By purging the fuel oil from the fuel in the fuel selection unit 36, fuel line 14, fuel nozzle 12, etc., the fuel oil is unable to coke, form wax, and/or form excess soot during shutdown as well as during the time period between shutdown and the next restart of the turbine system 8. The distillate fuel will therefore remain within the fuel selection unit 36 and the fuel line 14, and thus maintain an open flow path to the fuel nozzle 12 until the next restart of the turbine system 8.

This unused distillate fuel may then be used to light off the turbine system 8 during the next restart. However, instead of continuing to use distillate fuel through the entire restart and initial loading, the fuel system 10 enables a rapid transition to fuel oil. For example, a typical restart uses distillate fuel to increase the rotational speed of the gas turbine to ~100% and then partial loading of the turbine system 8 (e.g., loading to ~30%). In contrast, the fuel system 10 uses distillate fuel in the fuel line 14, that is the distillate fuel leftover from the previous shutdown, to light off the turbine system 8 and then uses the fuel oil to bring the gas turbine system 8 to ~100% rotational speed and eventually loading. Accordingly, less distillate fuel is used during the restart of the turbine system 8, which may reduce operating costs.

However, in order to restart the turbine system 8 using fuel oil, the fuel oil may be pressurized above a threshold pressure and/or heated above a threshold temperature. If unpressurized and unheated the fuel oil may block the ability of the turbine system 8 to restart. The fuel system 10 may therefore include one or more sensors that provide feedback regarding the properties of the fuel oil and/or other properties of the turbine system 8. For example, the fuel system 10 may include one or more temperature sensors 48 and one or more pressure sensors 50 that respectively measure the temperature of the fuel oil to determine if the temperature of the fuel oil are above respective thresholds and the pressure of the fuel line 14 to ensure the distillate fuel pressure are above respective thresholds that enable restart of the turbine system 8 with fuel oil. The temperature sensor 48 may be placed at various locations on a flow path between the non-distillate tank 18 and the combustor 20. For example, the temperature sensor(s) 48 may couple to the heater 40, to the fuel selection unit 36, to the fuel line 14, and/or fuel nozzle 12 to detect the temperature of the fuel oil. Similarly, the pressure sensor(s) 50 may be placed at various locations along the flow path between the fuel selection unit 36 and the combustor 20. For example, the pressure sensor(s) 50 may couple to the fuel selection unit 36, the fuel line 14, and/or the fuel nozzle 12 to detect the pressure of the fuel oil. In some embodiments, the fuel system 10 may also include an atomization air pressure sensor 52 that detects whether the fuel oil is sufficiently atomized for combustion. These sensors 48, 50, and 52 couple to the controller 42 enabling the controller 42 to restart the turbine system 8 with fuel oil through control of the pump 38, the heater 40, and the fuel selection unit 36.

Figure 2:
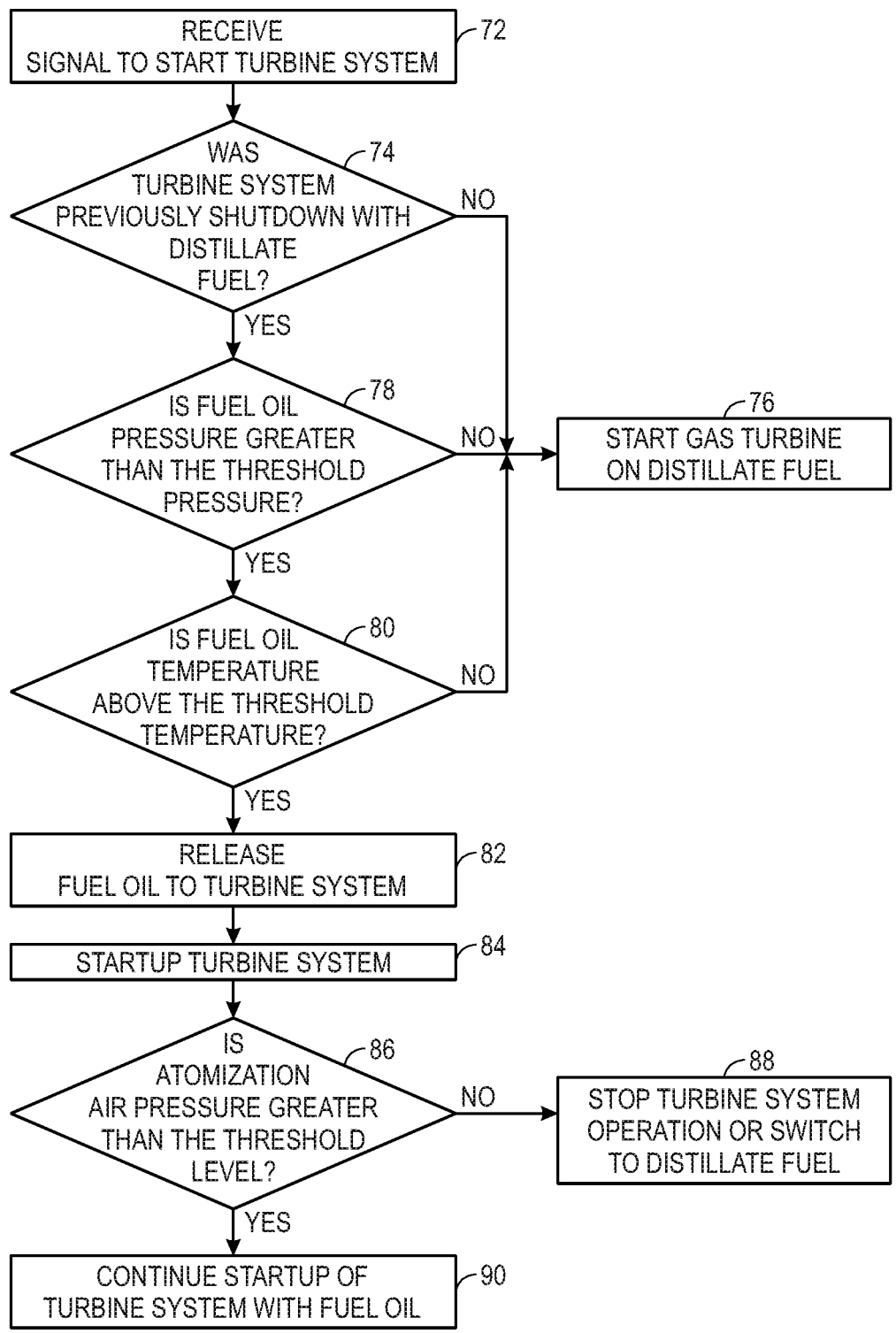
FIG. 2 is a method for starting a gas turbine system, in accordance with an embodiment.

FIG. 2 is an embodiment of a method 70 for starting a turbine system. The method 70 begins by receiving a signal to start the turbine system, step 72. The method 70 then determines if the turbine system was previously shutdown with distillate fuel, step 74. As explained above, the turbine system described above uses leftover distillate fuel in the fuel line 14 to light off the turbine system. If the turbine system was not shutdown with distillate fuel, then the method 70 starts the turbine system on distillate fuel, step 76. If the turbine system was previously shutdown on distillate fuel, the method 70 determines if the fuel pressure is greater than a threshold pressure, step 78. For example, the controller 42 may receive feedback from the pressure sensor(s) 50 indicating that the pressure in the fuel line 14 is insufficient (e.g., less than 25 PSIG) to maintain combustion in the turbine system. If the pressure of the fuel oil is less than the threshold the method 70 starts the turbine system on distillate fuel, step 76. If the fuel oil pressure is greater than the threshold, the method 70 determines if the fuel oil has a temperature greater than a threshold temperature, step 80. For example, the controller 42 may receive feedback from the temperature sensor(s) 48 indicating that the temperature of the fuel oil is insufficient (e.g., less than 100 F) to maintain combustion in the turbine system. If the temperature of the fuel oil is less than the threshold the method 70 starts the turbine system on distillate fuel, step 76.

If the turbine system was previously shutdown with distillate fuel, the fuel line 14 pressure is above the threshold pressure, the fuel oil is above the threshold temperature, the method 70 then continues by releasing fuel oil, step 82. That is, the controller 42 signals the fuel selection unit 36 to release the fuel oil to the fuel nozzle(s) 12. The method 70 then starts the turbine system, step 84. When the turbine system starts, the leftover distillate fuel is ignited starting combustion in the combustor 20. As the distillate fuel combusts the exhaust gases flow through the turbine 22 increasing the speed of the turbine 22 and therefore rotation of the shaft 26. The turbine system continues to combust the leftover distillate fuel until the fuel oil reaches the fuel nozzle 12. The turbine system will then combust the fuel oil to increase the rotational speed of the turbine system and then as the turbine system loads (e.g., increases electrical output). In some embodiments, the method 70 may determine if the atomization air pressure is greater than a threshold level, step 86. By monitoring air atomization pressure, the method 70 may determine whether the fuel oil is sufficiently atomized for combustion. More specifically, that a sufficient percentage of the fuel oil will combust in the combustor 20. If the atomization pressure is less the threshold, the method 70 may stop the turbine system or switch to using distillate fuel, step 88. For example, the controller 42 signals the fuel selection unit 36 to block the flow of fuel oil while releasing distillate fuel for combustion. If the atomization pressure is greater than the threshold, the method 70 continues startup of the turbine system with the fuel oil, step 90. That is, increasing the speed of the turbine 22 and then increasing the load once the turbine reaches steady state speeds.

Technical effects of the invention include a gas turbine fuel system that enables a turbine system to start operation with fuel oil (i.e., hydrocarbon molecules with carbon chains of $C_{20}$ or greater). That is, the gas turbine fuel system enables the turbine system to reach operational speed prior to loading by using fuel oil.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A gas turbine system, comprising:
   a first pump configured to supply distillate fuel to a combustor;
   a second pump configured to supply fuel oil to the combustor;
   a fuel selector configured to control a first flow of distillate fuel and a second flow of fuel oil to the combustor; and
   a controller comprising a processor, memory, and instructions stored on the memory and executable by the processor, wherein the controller is configured to receive feedback from a sensor and control the first pump, the second pump, and the fuel selector to perform a startup of the gas turbine system in response to the feedback from the sensor, wherein the controller is configured to:
      start the gas turbine system by operating the second pump to flow the fuel oil through a fuel line to the combustor if (A) the controller determines that the fuel line contains the distillate fuel prior to the startup such that the distillate fuel flows to the combustor prior to the fuel oil when operating the second pump, and (B) the feedback indicates the fuel oil meets a threshold for the startup using the fuel oil; and
      start the gas turbine system by operating the first pump to flow the distillate fuel through the fuel line to the combustor if (A) the controller determines that the fuel line does not contain the distillate fuel prior to the startup, or (B) the feedback indicates the fuel oil does not meet the threshold for the startup using the fuel oil.

2. The system of claim 1, comprising a heater configured to heat the fuel oil prior to combustion in the combustor.

3. The system of claim 1, wherein the sensor is a pressure sensor configured to detect a pressure of the fuel oil as the feedback, and the feedback indicates whether the fuel oil meets a pressure threshold for the startup using the fuel oil.

4. The system of claim 1, wherein the sensor is a temperature sensor configured to detect a temperature of the fuel oil as the feedback, and the feedback indicates whether the fuel oil meets a temperature threshold for the startup using the fuel oil.

5. The system of claim 1, wherein the sensor is an atomization air pressure sensor configured to detect an atomization air pressure for atomizing the fuel oil as the feedback, and the feedback indicates whether the fuel oil meets an atomization air pressure threshold for the startup using the fuel oil.

6. The system of claim 1, wherein the distillate fuel consists essentially of hydrocarbon molecules with carbon chains equal to or smaller than $C_{20}$.

7. The system of claim 1, wherein the fuel oil consists essentially of hydrocarbon molecules with carbon chains greater than $C_{20}$.

8. A system, comprising:
   a controller comprising a processor, memory, and instructions stored on the memory and executable by the processor, wherein the controller is configured to receive feedback from one or more sensors and control a first pump that pumps a distillate fuel, a second pump that pumps fuel oil, and a fuel selector that controls a first flow of the distillate fuel and a second flow of the fuel oil to a combustor of a gas turbine system to perform a startup of the gas turbine system in response to the feedback from the one or more sensors, wherein the controller is configured to:
   start the gas turbine system by operating the second pump to flow the fuel oil through a fuel line to the combustor if (A) the controller determines that the fuel line contains the distillate fuel prior to the startup such that the distillate fuel flows to the combustor prior to the fuel oil when operating the second pump, and (B) the feedback indicates the fuel oil meets a threshold for the startup using the fuel oil; and
   start the gas turbine system by operating the first pump to flow the distillate fuel through the fuel line to the combustor if (A) the controller determines that the fuel line does not contain the distillate fuel prior to the startup, or (B) the feedback indicates the fuel oil does not meet the threshold for the startup using the fuel oil.

9. The system of claim 8, wherein the controller is configured to determine a type of fuel used in the previous shutdown of the gas turbine system, wherein in response to the type of fuel used in the previous shutdown being distillate fuel the controller determines that the fuel line contains the distillate fuel prior to the startup.

10. The system of claim 8, wherein the fuel oil consists essentially of hydrocarbon molecules with carbon chains greater than $C_{20}$, wherein the distillate fuel consists essentially of hydrocarbon molecules with carbon chains equal to or smaller than $C_{20}$.

11. The system of claim 8, wherein the one or more sensors comprise a pressure sensor configured to detect a pressure of the fuel oil in the fuel line as the feedback, wherein the feedback indicates that the fuel oil meets the threshold if the pressure exceeds a threshold pressure, and the feedback indicates that the fuel oil does not meet the threshold if the pressure is less than the threshold pressure.

12. The system of claim 8, wherein the one or more sensors comprise a temperature sensor configured to detect a temperature of the fuel oil as the feedback, wherein the feedback indicates that the fuel oil meets the threshold if the temperature exceeds a threshold temperature, and the feedback indicates that the fuel oil does not meet the threshold if the temperature is less than the threshold temperature.

13. The system of claim 8, wherein the one or more sensors comprise an air atomization pressure sensor configured to detect an air atomization pressure for atomizing the fuel oil as the feedback, wherein the feedback indicates that the fuel oil meets the threshold if the air atomization pressure exceeds a threshold air atomization pressure, and the feedback indicates that the fuel oil does not meet the threshold if the air atomization pressure is less than the threshold air atomization pressure.

14. The system of claim 8, comprising the gas turbine system, the first pump, the second pump, and the fuel selector.

15. A system, comprising:
   a controller configured to receive feedback from one or more sensors and in response to the feedback from the one or more sensors control a first pump that pumps a distillate fuel, a second pump that pumps fuel oil, and a fuel selector that controls a first flow of the distillate fuel and a second flow of the fuel oil to a gas turbine system to start the gas turbine system on the fuel oil;
   wherein each of the one or more sensors is configured to detect a parameter of the fuel oil in a fuel line, and the parameter comprises a pressure or a temperature of the fuel oil in the fuel line;
   wherein in response to the parameter exceeding a threshold, the controller is configured to start the gas turbine system on the fuel oil; and
   wherein in response to the parameter being less than the threshold, the controller is configured to start the gas turbine system on the distillate fuel; and
   wherein the controller is configured to determine whether the fuel line contains the distillate fuel prior to the startup, the controller is configured to start the gas turbine system on the fuel oil only if the fuel line contains the distillate fuel prior to the startup, such that the distillate fuel flows to a combustor of the gas turbine system prior to the fuel oil when starting up on the fuel oil.

16. The system of claim 15, wherein the parameter comprises the pressure and the threshold comprises a pressure threshold.

17. The system of claim 15, wherein the parameter comprises the temperature and the threshold comprises a temperature threshold.

18. The system of claim 15, comprising the first pump, the second pump, and the fuel selector.

19. The system of claim 15, comprising the gas turbine system.

* * * * *